United States Patent
Johnson

(10) Patent No.: US 7,853,481 B1
(45) Date of Patent: Dec. 14, 2010

(54) EDROPSHIP: METHODS AND SYSTEMS FOR ANONYMOUS ECOMMERCE SHIPMENT

(75) Inventor: Richard C. Johnson, Cupertino, CA (US)

(73) Assignee: Oracle International Corporation, Redwood Shores, CA (US)

(*) Notice: Subject to any disclaimer, the term of this patent is extended or adjusted under 35 U.S.C. 154(b) by 0 days.

(21) Appl. No.: 09/490,783

(22) Filed: Jan. 24, 2000

(51) Int. Cl.
G06Q 30/00 (2006.01)
(52) U.S. Cl. ....................................... 705/26
(58) Field of Classification Search ................... 705/26
See application file for complete search history.

(56) References Cited

U.S. PATENT DOCUMENTS

| | | | |
|---|---|---|---|
| 4,903,201 A | 2/1990 | Wagner | |
| 5,329,589 A | 7/1994 | Fraser et al. | |
| 5,557,518 A * | 9/1996 | Rosen ......................... | 403/344 |
| 5,671,279 A * | 9/1997 | Elgamal ....................... | 380/29 |
| 5,748,740 A * | 5/1998 | Curry et al. .................. | 235/379 |
| 5,794,207 A * | 8/1998 | Walker et al. ................. | 705/1 |
| 5,812,670 A * | 9/1998 | Micali ......................... | 705/74 |
| 5,845,265 A | 12/1998 | Woolston | |
| 5,873,071 A * | 2/1999 | Ferstenberg et al. .......... | 705/36 |
| 5,898,777 A | 4/1999 | Tycksen | |
| 5,970,475 A * | 10/1999 | Barnes et al. ................ | 340/5.8 |
| 5,987,440 A | 11/1999 | O'Neil | |
| 6,029,150 A | 2/2000 | Kravitz | |
| 6,055,504 A | 4/2000 | Chou et al. | |
| 6,055,520 A * | 4/2000 | Heiden et al. ............... | 705/410 |
| 6,058,379 A * | 5/2000 | Odom et al. .................. | 705/37 |
| 6,081,790 A * | 6/2000 | Rosen .......................... | 705/40 |
| 6,161,181 A * | 12/2000 | Haynes et al. ............... | 713/170 |
| 6,236,972 B1 * | 5/2001 | Shkedy .......................... | 705/1 |
| 6,260,024 B1 * | 7/2001 | Shkedy .......................... | 705/10 |
| 6,394,354 B1 * | 5/2002 | Wilz et al. ................... | 235/375 |
| 6,539,360 B1 * | 3/2003 | Kadaba ........................ | 705/28 |
| 6,807,530 B1 * | 10/2004 | Shub et al. ..................... | 705/1 |
| 2001/0029492 A1 * | 10/2001 | Uchikata ...................... | 705/64 |
| 2002/0023037 A1 * | 2/2002 | White, Jr. ..................... | 705/37 |

(Continued)

FOREIGN PATENT DOCUMENTS

WO    WO 0014648 A1    9/1999

OTHER PUBLICATIONS

Wollinsky, Howard, "Parts Trader Gets on Fast Track," Chicago Sun Times, Nov. 3, 1997.*

(Continued)

*Primary Examiner*—Luke Gilligan
(74) *Attorney, Agent, or Firm*—Townsend and Townsend and Crew LLP

(57) ABSTRACT

A method of enabling anonymous shipment of a package containing goods purchased by a customer from a vendor for delivery to an address unknown to the vendor includes steps of receiving a request for a package code for the package from the vendor, sending the package code to the vendor, the package code being devoid of delivery address information and sending a shipping identifier and an associated address to the shipper. The shipper, after picking up the package for shipment from the vendor, matches the package code sent to the vendor with the shipping identifier and identifies the associated address as the delivery address of the package. A shipping label may then be printed out and affixed to the package.

12 Claims, 3 Drawing Sheets

U.S. PATENT DOCUMENTS

2004/0002903 A1* 1/2004 Stolfo et al. ............. 705/26
2004/0260653 A1* 12/2004 Tsuei et al. ............. 705/54

OTHER PUBLICATIONS

Van Name, Mark L and Catchings, Bill, "Speed Is the Key To Online Selling Success," PC Week, Dec. 14, 1998.*
World Wide Web Site: The Identrus Solution, Overview http://identrus.com/solutionhome.htm Printed on Jan. 19, 2000, Author Unknown.
World Wide Web Site: The Identrus Solution, How Identrus Works http://www.identrus.com/structurehome.htm Printed on Jan. 19, 2000, Author Unknown.
World Wide Web Site:The Identrus Solution, FAQ http://identrus.com/solutionfaq.htm Printed on Jan. 19, 2000, Author Unknown.
Perry, Tekla S., *Electronic Money: Toward A Virtual Wallet*, IEEE Spectrum, Feb. 1997, pp. 18-20.
Kelley, Edward W. Jr., *The Future Of Electronic Money: A Regulator's Perspective*, IEEE Spectrum, Feb. 1997, pp. 21-22.
Sirbu, Marvin A., *Credits and Debits On The Internet*, IEEE Spectrum, Feb. 1997, pp. 23-29.
Chaum, David and Brands, Stefan, *Minting Electronic Cash*, IEEE Spectrum, Feb. 1997, 30-34.
Gemmell, Peter S., *Traceable E-Cash*, IEEE Spectrum, Feb. 1997, pp. 35-37.
Morris, Stanley E., *Crime And Prevention: A Treasury Viewpoint*, IEEE Spectrum, Feb. 1997, pp. 38-39.
Baldwin, Robert W. and Chang, C. Victor, *Locking the E-Safe*, IEEE Spectrum, Feb. 1997, pp. 40-46.
Hovenga Fancher, Carol, *In Your Pocket: Smartcards*, IEEE Spectrum, Feb. 1997, pp. 47-53.
McChesney, Michael C., *Banking in Cyberspace: An Investment In Itself*, IEEE Spectrum, Feb. 1997, pp. 54-59.
Wallman, Steven M.H., *Technology Takes To Securities Trading*, IEEE Spectrum, Feb. 1997, pp. 60-65.
Berkeley, Alfred R. III, *Nasdaq's Technology Floor: Its President Takes Stock*, IEEE Spectrum, Feb. 1997, pp. 66-67.
Ter Maat, Mike, *The Economics of E-Cash*, IEEE Spectrum, Feb. 1997, pp. 69-73.
Daly, James J., *The Money Changer*, Credit Card Management, Jun. 1995,pp. 1-4; World Wide Web http://proquest.umi.com/pqdweb?TS=98079...Fmt=3&Sid=10&Idx=5&Deli=1&RQT=309&Dtp=1 (Printed on Jan. 20, 2001).
Morgan, Travis A. and Harnack, Ron, WebAssured.com: *WebAssured "the dot.confidence company" and* Layeway.com *Form Stategic Partnership;Pact Aligns Internet's Most Comprehensive Online Merchant CertificationProgram With Premiere Online Alternative Payment Solutions Provider*,M2 Presswire; Coventry, Oct. 18, 2000, pp. 1-3,World Wide Web http://proquest.umi.com/pqdwebS=98079...Fmt=3&Sid=11&Idx=2&Deli=1&RqtRQT=309&Dtp=1 (Printed on Jan. 29, 2001).
Rosen, Michele, *Cash For Cyberspace*, Midrange Systems, Spring House, Apr. 12, 1996, p. 1; World Wide Web http://proquest.umi.com/pgdweb?TS=98079...&Fmt=1&Sid=8&Idx=2&Deli=1&RQT=309&Dtp=1 (Printed on Jan. 29, 2001).
Shiels, Merry, *More Than Simply Cyber Cents*, Chief Executive, New York, Dec. 1995, pp. 1-2, World Wide Web http://proquest.umi.com/pqdweb?TS=98079...&Fmt=3&Sid=8&Idx=3&Deli=1&RQT=309&Dtp=1 (Printed on Jan. 29, 2001).
Anon2u.com, *The Way To Avoid Divulging Personal Or Financial Information To Multiple Websites While Shopping Online*, p. 1, World Wide Web http://www.anon2u.com/ (Printed Jan. 29, 2001).
Anon2u.com, *The Service Options We Offer*, p. 1, World Wide Web http://www.anon2u.com/ (Printed on Jan. 29, 2001).
C/Net news.com, http://www.news.com/, "AT&T sues eBay, PayPal over patent", Jan. 21, 2004.
EP Examination Report of Feb. 2, 2009 in corresponding EP application 00983984.6.

* cited by examiner

EDROPSHIP: METHODS AND SYSTEMS FOR ANONYMOUS ECOMMERCE SHIPMENT

BACKGROUND OF THE INVENTION

1. Field of the Invention

This invention relates to the safeguarding of personal information in electronic commerce transactions. More particularly, the present invention addresses the privacy concerns of consumers in the electronic marketplace by limiting access to package delivery information.

2. Description of the Related Art

The advent of electronic commerce over the Internet has spurred economic development by fostering new products and industries and revitalizing old ones. Electronic commerce has also brought an unprecedented array of choices to consumers, who now can make purchases without regard to geographical or political boundaries. However, the increasingly global interconnectivity making such electronic commerce possible is fraught with potential dangers to the consumer. One such danger is the misuse of personal and financial information. Indeed, each time that a consumer makes an online purchase from a vendor over the World Wide Web (hereafter "Web"), he or she typically must supply the vendor with personal information, such as his or her name, address, telephone numbers, email address and financial information such as a credit card number, for example. Often the consumer is also invited to supply other information, such as annual income, number of dependents, etc. Such information tends to be persistent, and is usually stored in databases (whether such database belong to the vendor, credit agencies or other vendors) and may be used for purposes wholly unforeseen by the customer at the time of the original transaction. Individual consumers are not the only ones that may be harmed by such practices; businesses also have an interest in protecting their business information, be it customer lists, key suppliers and the like.

Even if the online purchase, however, is somehow made in an anonymous or quasi-anonymous fashion (that is, without divulging personal or financial information to the vendor), the vendor typically must still ship the package to a delivery address, which may be the purchaser's home or business address or the address of a customer, friend or relative. This information, then, must be given to the vendor who then may store the supplied information for later use or misuse.

Some of the potential consequences of providing such addressee information to the vendor are discussed with reference to FIG. 1, which shows a conventional method of shipping goods from a vendor to a customer. As shown therein, the customer makes an electronic purchase at S11, and is invited to provide the vendor with his or her personal and financial information, such as payment information (credit card numbers, for example) and personal information such as telephone numbers, physical and/or electronic addresses (email address, for example) and shipping information, as shown at S13. At step S14, the vendor processes and stores the supplied information (typically in a database, as shown at reference numeral 10 in FIG. 1). The vendor then packages the goods purchased by the customer, applies a shipping label to the package and surrenders the package to a shipper or freight forwarder (such as the US post office, UPS® or FedEx®, for example) for delivery to the customer 12.

However, the effects of supplying the vendor with the above-listed personal and financial information are not confined to the underlying purchase. Indeed, as shown in FIG. 1, the vendor may itself send the customer 12 unwanted email, subject the customer 12 to unwanted telephone solicitations, or send the customer unsolicited commercial mailings (commonly referred to as "junk mail"). More egregious still, the vendor may sell the customer-provided information to third parties, collectively referenced in FIG. 1 at 14. The vendor may also sell aggregate customer information—that is, information that does not identify any particular one customer, a relatively benign act. However, the vendor may also sell his or her customers' individual personal and financial information to third parties 14, without the consent or knowledge of the affected customers. In turn, such third parties 14 may also subject the customer 12 to a barrage of unwanted emails, solicitations and/or junk mail. The customer, if a business, may have business reasons such as the preservation of trade secrets, for wanting anonymous shipping. Such unwelcome intrusions are, however, but a few manifestations of the universe of all possible deliberate uses and misuses of personal and financial information. Indeed, the customer's personal and financial information may be purchased or intercepted by parties wholly unforeseen by the customer and used for illegal purposes, such as to facilitate identity theft, for example. This problem is exacerbated by the increasing proliferation of e-commerce vendors and Web sites, each of which collects and uses the customers' personal and financial information.

However, even if the actual purchase is somehow made in an anonymous or quasi-anonymous fashion (akin to a face-to-face cash transaction, for example), the package containing the purchased goods still must be delivered to the customer or other addressee. In turn, this entails that the name and address of the recipient of the package be provided to the vendor, with all of the above-detailed potential consequences of providing such information.

SUMMARY OF THE INVENTION

An object of the present invention, therefore, is to provide methods and systems for anonymous shipment of goods. Another object of the present invention is to provide methods and systems for vendors, shippers and trusted parties such as banks to handle anonymous shipments of goods. It is a still further object of the present invention to provide methods and systems for the anonymous forwarding of goods in digital form, such as software and music.

In accordance with the above-described objects and those that will be mentioned and will become apparent below, a method of enabling anonymous shipment of a package containing goods purchased by a customer from a vendor for delivery to an address unknown to the vendor, comprises steps of receiving a request for a package code for the package from the vendor; sending the package code to the vendor, the package code being devoid of delivery address information and sending a shipping identifier and an associated address to the shipper. The shipper, after picking up the package for shipment from the vendor, matches the package code sent to the vendor with the shipping identifier and identifies the associated address as the delivery address of the package. The package code may include a code number and machine-readable indicia expressing the code number. The received request may include a request for authentication and/or an electronic draft for payment of the purchased goods and/or a shipping charge. The receiving and sending steps may be performed over a computer network, including leased lines, a private network, a virtual private network and/or the Internet. The receiving and sending steps may be carried out by a bank or other trusted party.

According to another embodiment thereof, the present invention is a method of processing a package identified by a package code devoid of delivery address information, the package containing goods purchased by a customer from a vendor for shipment to an address unknown to the vendor, comprising steps of receiving a request to pick up a package from the vendor, the package having a machine-readable package code affixed thereto, the request including a shipping identifier and a delivery address associated with the shipping identifier; picking up the package from the vendor; reading the package code affixed to the package; matching the package code with the received shipping identifier, and delivering the package to the delivery address associated with the shipping identifier.

Steps of printing a shipping label on which the delivery address is visible and affixing the shipping label on the package may also be carried out. The package code may include a code number and/or machine-readable indicia expressing the code number. The receiving step may be performed over a computer network that includes, for example, leased lines, a private network, a virtual private network and/or the Internet. The request may be sent to the shipper by a bank or by some other trusted party.

According to still another embodiment, the present invention is a method of causing a package of goods purchased from a vendor to be delivered to an address unknown to the vendor, comprising steps of sending a request for a package code to a trusted entity; receiving the package code, the package code being devoid of delivery address information; affixing the package code to the package, and surrendering the package to a shipper. The shipper then matches the package code with a shipping identifier and associated delivery address previously received from the trusted entity, generates a shipping label specifying the associated delivery address and affixes the label to the package. The package code may include a code number and/or machine-readable indicia expressing the code number. The request may include a request for authentication and/or an electronic draft for payment of the purchased goods and/or a shipping charge. The receiving and sending steps may be performed over a computer network. The trusted entity may be a bank, for example.

The present invention may also be viewed as a method of enabling a customer to anonymously purchase an item from a vendor via an electronic draft for delivery to an address without divulging the delivery address to the vendor, comprising the steps of storing, in a bank, an encrypted unique identifier for the customer, the encrypted unique identifier being linked to the customer's personal and financial information stored in the bank, including the delivery address; authenticating the customer having caused a draft to be executed for payment of at least one of a purchase price of the item and a shipping cost by encrypting at least a portion of an identification data provided by the customer and successfully matching the encrypted identification data with the stored encrypted unique identifier; retrieving at least the authenticated customer's financial information and delivery address; honoring a draft presented by the vendor for payment of the item only when the customer is successfully authenticated by the bank; assigning a package code to the item, the assigned package code being associated with the retrieved delivery address; sending only the package code to the vendor, the vendor affixing the package code to the package, and sending the package code and the associated delivery address to a shipper for storage in a shipper database. The shipper then picks up the item from the vendor, and prints out a shipping label for the package, a delivery address on the label being that customer address linked to a package code stored in the shipper database that matches the package code affixed to the package.

The identification data may include an ID and a password, biometric data and/or a digital certificate at the bank's discretion, as required for appropriate security, given the value of the transaction. The password is preferably known to the bank only in encrypted form. The customer's encrypted unique identifier, personal and financial information may be stored in a data structure managed by a Directory software controlled by the bank. The package code and the linked customer address may be replicated in the shipper database via Light Weight Directory Access Protocol (LDAP) or similar standard format. At least a portion of the shipper database may be replicated in a portable electronic device equipped with a package code scanner and a shipping label printer. The package code may include a code number and/or a machine-readable indicia expressing the code number. The authenticating and sending steps may be performed over a computer network including, for example, the Internet.

According to still another embodiment, the present invention is a method of enabling a customer having purchased goods in digital form from a vendor to have the goods delivered to a specified electronic delivery address without divulging the electronic delivery address to the vendor, comprising the steps of associating a package code with the specified electronic delivery address and storing the package code and the electronic delivery address; sending the vendor a package code and an associated forwarding electronic address, the forwarding electronic address being different from the electronic delivery address, the vendor forwarding the goods and the package code to the forwarding electronic address associated with the received package code; reading the forwarded package code and retrieving the stored electronic delivery address associated therewith, and delivering the goods to the retrieved electronic delivery address. The associating and storing steps may be carried out by a bank or other trusted entity.

BRIEF DESCRIPTION OF THE DRAWINGS

For a further understanding of the objects and advantages of the present invention, reference should be made to the following detailed description, taken in conjunction with the accompanying figures, in which.

DESCRIPTION OF THE INVENTION

Definitions

VENDOR: Any person or entity that sells and/or offers goods and/or services for Sale (the seller).

CUSTOMER: Any person or entity that purchases goods and/or services from a Vendor (the buyer). The customer may be a business who, for business, privacy, or business reasons (such as the preservation of trade secrets, for example) may want to purchase and receive goods anonymously.

DELIVERY ADDRESS: A location to which the package is to be delivered. The delivery address may be a physical location to which a physical package may be delivered or may be an electronic address over a computer network such as the Internet.

SHIPPER: Any person or entity that ships or forwards the purchased goods and/or services to the delivery address.

PACKAGE: Any package that contains the goods or item(s) purchased by purchaser that is to be delivered by the shipper to the delivery address. The package may be in any form, such as a letter or package. The package may also be large, such as a Sea-Land® container or a railroad boxcar, for example. Alternatively, the package may be in electronic form and may include one or more electronic files to be delivered to an electronic address.

BANK: As used herein, the term "bank" includes all financial services institutions accepting deposits of cash, negotiable securities, marketable shares/stock into numbered (or otherwise uniquely-identified) accounts and honoring checks, drafts and/or other customer instructions. Such a definition includes (but is not limited to) traditional banks and savings institutions; stockbrokers, online trading concerns, credit unions and any institution that legally identifies with and has some financial and fiduciary relationship with an account holder and that has the ability to honor customer or account holder instructions referring to specific accounts. Within the context of the present invention, the term "bank" also includes such institutions as post offices or other governmental agencies that carry out banking or quasi-banking functions.

Functional Overview

Figure 1:
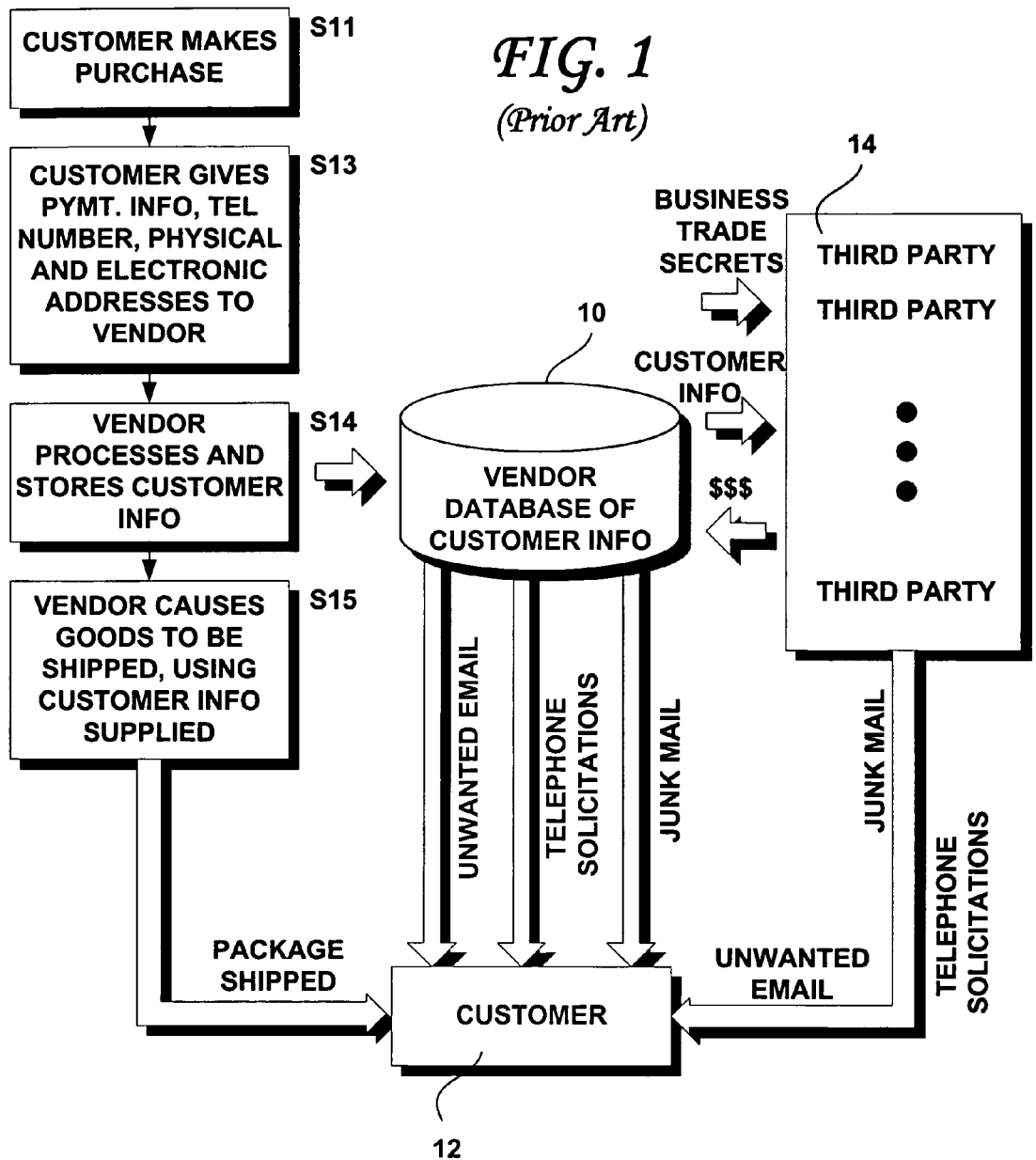
FIG. 1 is a flowchart of a conventional method of shipping goods from a vendor to a customer.
Figure 2:
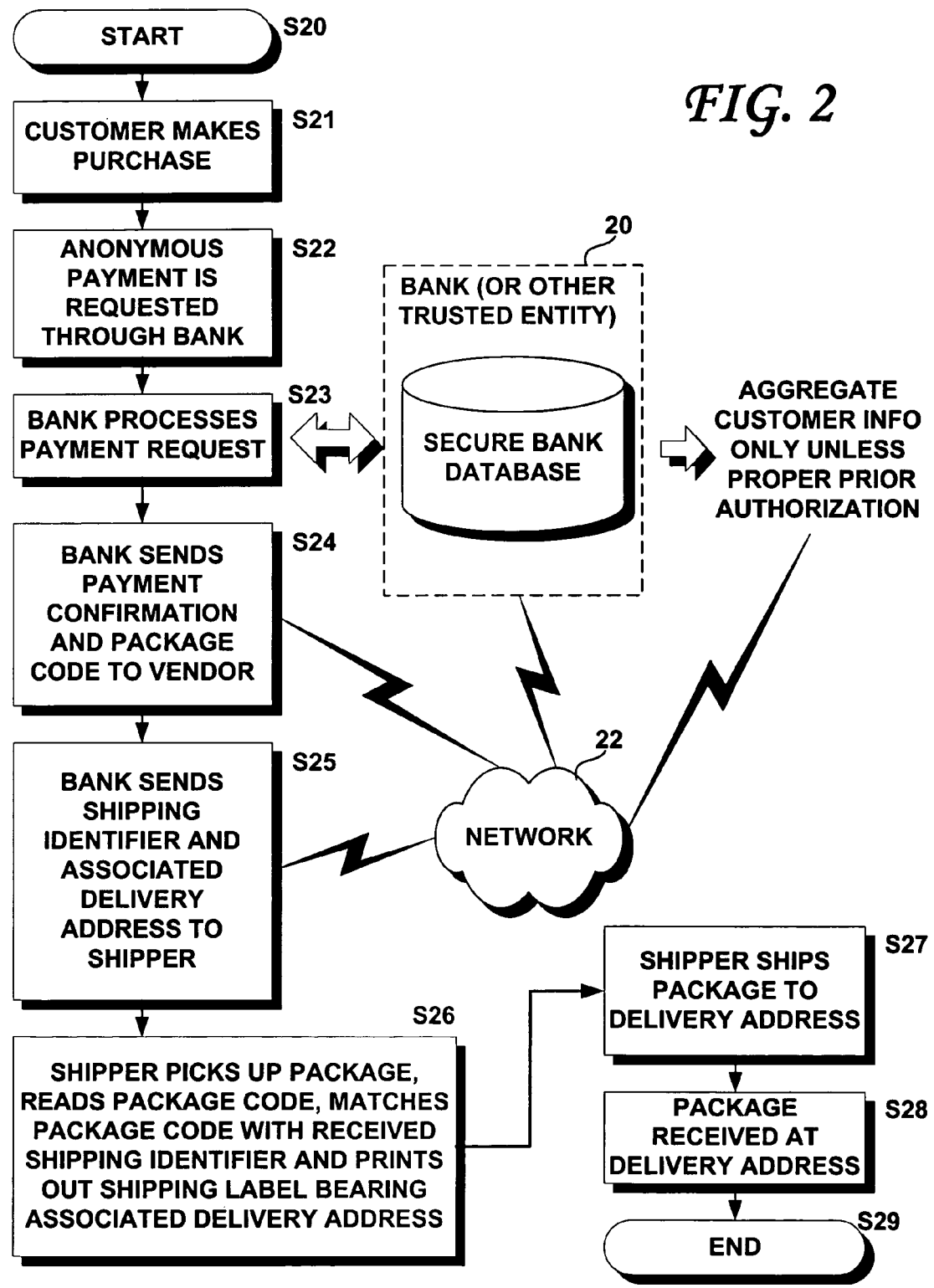
FIG. 2 is a flowchart of eDROPSHIP™, a method for anonymous shipping according to an embodiment of the present invention.

FIG. 2 is a flowchart of the eDROPSHIP™ method for anonymous shipping, according to an embodiment of the present invention. The method begins at step S20. At S21, the customer makes a purchase from, for example, the vendor's Web site. At step S22, the customer requests anonymous payment (anonymous with respect at least to the vendor) for his or her purchase through his or her bank 20. Although any means and/or methods for anonymous payment may be implemented within the context of the present invention, particularly well-suited methods and means for doing so are disclosed in commonly assigned U.S. patent application Ser. No. 09/272,056 filed Mar. 18, 1999 and 09/405,741 filed Sep. 24, 1999, the disclosures of which are hereby incorporated herein in their entirety. It is to be noted that the present invention also finds applicability in situations wherein the payment is not anonymous, but the customer does not wish to disclose the identity or address of the recipient of the package to the vendor and to any situation in which the customer wishes to keep the address of the package recipient from the vendor. The present invention is also applicable to in-person cash transactions.

According to the present invention, the only entity that should hold the customer's personal and confidential information is that entity that already enjoys a fiduciary relationship and a trusted relationship with the customer. According to an embodiment of the present invention, that entity is the customer's bank 20. The bank 20 is well suited to intermediate in electronic transactions, as it already stores the customer's financial and personal information in its secure database(s). According to the present invention, the bank 20 restricts access to the customers' personal and financial information, such as account numbers, credit card numbers, passwords, address, phone numbers and the like. As shown at S23, the bank 20 processes the request for anonymous payment for the goods purchased by the customer. For example, the request for anonymous payment may be in the form of an electronic draft. Using generally accepted legal terms, a draft is a written order by a first party, called the drawer, instructing a second party, called the drawee, to pay money to a third party, called the payee. In terms of the present invention, the vendor may be thought of as the payee, the customer as the drawer and the bank may be thought of as the drawee. In step S24, the bank 20 authorizes, guarantees and/or releases payment (on the electronic draft, for example) to the vendor for the goods (and/or the shipping charges) purchased by the customer. Along with or separately from the authorization, guarantee and/or electronic payment, the bank 20 sends a package code through the network 22 to the vendor, as shown in step S24. Preferably, the package code sent to the vendor includes a code number and machine-readable indicia expressing the code number. The code number may be an entirely numerical code number or may include other symbols and/or letters. According to an embodiment of the present invention, the machine-readable indicia includes a barcode. Other machine-readable indicia may be used within the context of the present invention. Examples of suitable machine-readable codes include the PDF code developed by Symbol Technologies, Inc. and the DataGlyph code developed by Xerox, Inc. The PDF code is a two-dimensional code that is used for the identification of fungible items, and is read using a handheld laser beam scanning technique. The DataGlyph code is a two-dimensional code disclosed in U.S. Pat. No. 5,245,165 and is used to provide information on office forms that are scanned using a conventional general-purpose document reader.

According to an embodiment of the present invention, the package code is entirely devoid of any package delivery information. Alternatively, the package code includes the delivery address, but in a form that is unreadable by the vendor. In any event, the vendor is not given access to the package delivery address, and thus cannot misuse the information or include such information in any later (even legitimate) marketing or sales efforts. Having received the package code from the bank 20, the vendor affixes or somehow otherwise imprints the package code on the package to be shipped. According to one embodiment of the present invention, the vendor affixes an adhesive label onto the package, the adhesive label bearing the package code thereon. For example, the vendor may affix a label onto the package to be shipped, the label having the machine-readable indicia such as a barcode, PDF, DataGlyph or other code printed thereon. The bank 20, as shown at S25, also sends a shipping identifier and an associated delivery address through the network 22 to a shipper such as, for example, the Untied States Postal Service or any private shipping or freight company, such as FedEx®, UPS® or DHL® for example. The bank 20 retrieves this information from its secure database and sends the shipping identifier and associated delivery address through a secure communication channel using a standardized protocol, such as the Secure Socket Layer (hereafter "SSL"), for example. SSL utilizes an encryption scheme (such as a public key encryption scheme, for example) negotiated at the time of the communication and helps to ensure that electronic eavesdroppers between the shipper and the bank 20 cannot intercept any clear, unencrypted communication.

The shipper to which the shipping identifier and the associated package delivery address are sent may be selected by the customer or by the bank 20. The shipping identifier sent to the selected shipper matches the package code sent to the vendor. The shipper stores the shipping identifier and the associated delivery address. As shown at S26, the shipper then picks up the package at the vendor's location, reads the package code, matches the read package code with the received shipping identifier and prints out a shipping label bearing the associated package delivery address thereon and affixes same to the package. In this manner, only the shipper and the bank know and/or have access to the delivery address. As shown in step S27, the shipper may now ship the package to the address on the shipping label in the usual manner. The shipped package may then be received at the intended delivery address, as shown at step S28, whereupon the method according to the present invention ends at S29.

In practice, the bank 20 may send the vendor an estimate of when the shipper will pick up the package, along with the package code. When the bank 20 sends the shipper the shipping identifier and associated delivery address, as shown in step S25, the bank 20 preferably also sends the shipper the vendor's name, address and contact information, such as telephone number(s), facsimile number(s) and email address, for example. The bank 20 may also send the shipper the customer's telephone number or other contact information. This information may be sent to the shipper's database and thereafter replicated or otherwise downloaded into a portable digital device, such as a Palm Computing device, as manufactured/modified by Symbol Technologies, Inc., for example. Such a device may store a subset of the shipper's main database. For example, an Oracle 8i Lite database may reside on the portable digital device and the subset of the shipper's main database may be replicated wirelessly into the portable digital device. In such a case, the above-listed information may be replicated therein, to allow the shipper to make the pick up and match the package code on the package with the shipping identifier and associated delivery address stored in the database (Oracle 8i Lite, for example, or a later version or incarnation thereof). Preferably, the portable digital device includes an integrated code reader device for reading the machine-readable indicia affixed to the package and a printer for printing out a shipping label, or the relevant portion thereof containing the package delivery address. Upon reading the machine-readable indicia affixed by the vendor on the package to be delivered, the database residing on the portable digital device then matches the package code embodied in the machine-readable indicia with the shipping identifier and associated delivery address (including the name of the recipient of the package, if appropriate) stored therein. The retrieved delivery address is then passed to the printer of or coupled to the portable digital device, which then prints the shipping label. The shipper may then affix the shipping label to the package and the shipping and actual delivery of the package may then proceed in the usual manner.

The methods and systems for anonymous shipment according to the present invention may also be utilized for shipping packages to addresses other than the address of the bank account holder. For example, the package may be "in care of" the bank account holder, but addressed to another person at another address. In that case, the bank account holder may store the "Care of" address within the bank database and specify that the "Care of" address is to be substituted for the delivery address in step S25. This may be done when the electronic draft is created and forwarded to the bank 20 for payment or upon otherwise arranging for a bank-intermediated payment or financing. Alternatively, the package may be a gift, or may have been bought on behalf of a person other than the bank account holder. In this case, the bank account holder may have caused a "Send to" address to be stored within the bank database, and the "Send to" address may be selected by the customer upon causing the electronic draft to be created and forwarded to the bank 20, or upon otherwise arranging for a bank-intermediated payment or financing. In the case wherein a package is undeliverable for any reason, the shipper may return the package to the bank 20 or to some location specified by the bank 20. Thereafter, the bank 20 may generate a message (such as an email, for example) informing the customer that his or her package is undeliverable. A charge may be levied against the customer's account to cover the costs associated with shipping and storing an undeliverable package.

The present invention, therefore, provides for an anonymous shipment system and method by which the customer's personal and financial information is safeguarded by entities having a fiduciary and/or contractual agreement to limit the dissemination of such information. For example, the shipper may be under a contractual obligation with the bank 20 not to make any disclosure of the personal and/or financial information gained through participation in the method or use of the system disclosed herein. Preferably, the bank 20 may only sell aggregate customer information to third parties, unless the customer has previously given the bank 20 his or her (full or limited) consent to the dissemination of his or her confidential information. The vendor, therefore, may purchase aggregate information (i.e., information that does not identify any one customer) for use in sales and/or marketing efforts, for example. The aggregate customer information may be filtered and sorted by the bank 20 to provide the vendors only with that information that they have requested, and only in the form in which they have requested the information. The vendor's sales and marketing informational needs are satisfied, therefore, without subjecting the customer to unwanted solicitations and intrusions into their privacy.

Should, however, the vendor wish to contact the customer to notify the customer of a product recall or to send the customer advertisement and special promotions, the vendor may send same electronically to the bank 20, including therein the package code sent to in step S24. The bank 20 may then forward the electronic recall, advertisement or promotion to the customer's physical or electronic address (e.g., email address), unless the customer bank account holder has previously indicated his or her preference not to receive any such messages or messages from this vendor, excepting, for example, product safety and recall information. Therefore, the vendor's link to the customer is not necessarily severed, but is managed and under the control of the customer, which is the party bearing the risk of loss in the case of uncontrolled dissemination of personal information. Implementation of the present method and system eventually recaptures the customers' confidentiality, as the vendors' databases will no longer be updated as the customers' personal and financial information changes. Instead, only the bank 20 and the shipper, both under a duty to preserve the confidentiality of the customers' information, will have access thereto.

The bank 20, according to the present invention, may guarantee that the shipper's charges will be paid. Indeed, the shipper may be paid directly from the account holder's account. In this manner, the vendor preferably only charges for the cost of the item and not for any related (and oft inflated) "shipping and handling" charges.

In the case wherein the goods purchased by the customer form the vendor are in electronic form, such as software, music or data, the bank 20 may send the vendor a package code and an electronic forwarding address to which to forward the customer's purchase. The vendor may then transmit the software, music or data to the specified electronic forwarding address, together with the supplied package code. The bank 20 may then match the package code with the customer's account(s) and cause the software, music, or other digital data purchased by the customer to the customer's own electronic address, to the customer's "Care of" electronic address or to the customer's "Send to" electronic address, as specified by the customer upon purchasing the item and arranging for its payment, whether anonymous or otherwise. The customer may modify his or her payment information, physical address(es), electronic address(es), "Care of" address(es), "Send to" address(es) or any other delivery address(es) at any time by logging onto a secure Web site maintained and controlled by the bank 20, becoming authenticated by the bank 20 by means of an ID/Password pair (for example), and entering/modifying the desired information by clicking a "Shipping Options" selection, for example.

Figure 3:
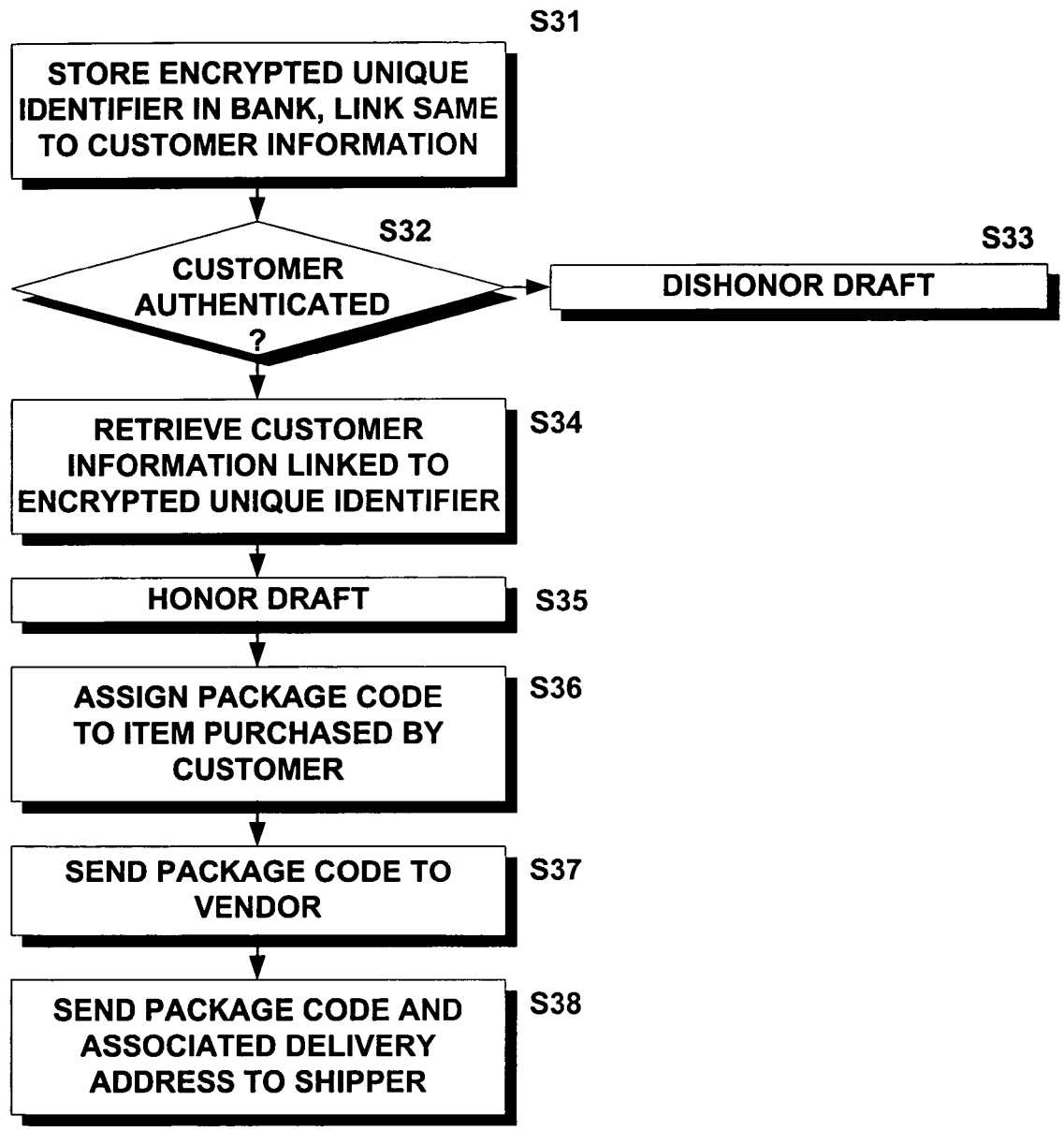
FIG. 3 shows another aspect of the present invention, in which the transaction between the vendor and the customer includes both anonymous payment and shipment.

FIG. 3 shows another aspect of the present invention, in which the transaction between the vendor and the customer includes both anonymous payment and shipment. As shown therein, a method of enabling a customer to anonymously purchase an item from a vendor via an electronic draft for delivery to an address without divulging the delivery address to the vendor may include the following steps. At step S31, an encrypted identifier unique to the customer is stored in a bank, or other trusted entity. The encrypted unique identifier is linked to the customer's personal and financial information stored in the bank, including the delivery address (or one or more "Send to" addresses and/or one or more "Care of" addresses). The delivery address may be the customer's own home or business address, or someone else home or business address. In step S32, it is determined whether the customer has been authenticated by the bank. To do so, the customer may log onto the bank's Web site set up for that purpose, as disclosed in above-cited U.S. patent application Ser. Nos. 09/272,056 and/or 09/405,741. The bank-buyer agreement will define the appropriate authentication measures. Once logged on over the network 22 (which may, for example, include the Internet), the customer provides the bank 20 with identification data, at least a portion of which may be immediately encrypted and compared with the previously stored encrypted unique identifier for that customer. Upon a successful match, the customer is authenticated. If the identification data provided does not match the stored encrypted unique identifier, the customer is not authenticated and no electronic draft will be honored on the customer's account (until such authentication is successful), as shown at S33. At S34, the bank 20 or other trusted party retrieves the stored customer's personal and/or financial information linked to the encrypted unique identifier. At step S35, the electronic draft presented to the bank 20 for payment of the customer's purchases is honored, subject to any bank-imposed restrictions, such as sufficient account balances or credit, for example. The bank 20 may then assign a package code to the item(s) purchased by the customer and send the package code (preferably electronically) to the vendor. The vendor may then affix a machine-readable indicia expressing the package code to the package. As shown at S38, the package code and the package delivery address may be sent to the shipper, along with an identification of the vendor and other relevant information. In a preferred embodiment, the shipper maintains an iDRAFT™ account at a participating iDRAFT™ bank, in the manner disclosed in the above cited U.S. patent application Ser. Nos. 09/272,056 and/or 09/405,741. The shipper may then pick up the package identified by the package code, read the machine-readable indicia affixed thereto, retrieve the delivery address associated therewith, print out a shipping label and affix same to the package.

The customer's identification data may include an ID and a password and/or other identifying data, such as biometric data, for example. As the customer's password is known to the bank 20 only in encrypted form, the bank 20 preferably encrypts the customer-provided password immediately upon receipt. Preferably, the customer's encrypted unique identifier, personal and financial information are stored by the bank 20 or other trusted entity in a data structure managed by a Directory software controlled by the bank. Directory software typically includes a repository (e.g., a list or database, for example) of names, permissions, resources, hardware, software and hierarchical information and/or rules within a network. The phrase "Directory software", according to the present invention, encompasses any software including or managing such a repository that is designed to operate on computers coupled to a network. For example, the bank 20 may store the above-listed information in a Directory software compatible with and accessible through Directory access software, such as Directory access software compatible with the X.500 Directory Access Protocol (DAP), which protocol is incorporated herein by reference, or a subset, extension or variant thereof. One such subset of DAP is the Lightweight Directory Access Protocol or LDAP. For example, the customer's bank 20 may implement Oracle Internet Directory™ (OiD™) software (or upgrades/variants thereof), a software product developed by the assignee of the present invention. OiD™ combines a native implementation of the Internet Engineering Task Force's (IETF) LDAP v3 standard (also incorporated herewith in its entirety by reference) with, for example, an Oracle8 (or later implementation) back-end data store. In like manner, the shipper may store the package code and the delivery address provided to it by the bank 20 within a database managed by a Directory software compatible with the LDAP v3 (or later versions) protocol, such as the above-identified OiD™ software from Oracle Corporation. A portion of this database may be replicated (via the LDAP protocol, for example) in a portable digital device (such as the SPT1700 series of "Palm" computing devices manufactured/modified by Symbol Technologies, Inc., for example) in which an Oracle 8i Lite (or later versions thereof) database resides. This allows the shipper actually making the pick up of the package to have all relevant information available at the vendor's location when he or she picks up the package identified by the package code. Other Directory software may be used for this purpose, such as Novell Directory Services™ (NDS™) of Novell, Inc.

While the foregoing detailed description has described preferred embodiments of the present invention, it is to be understood that the above description is illustrative only and not limiting of the disclosed invention. Those of skill in this art will recognize other alternative embodiments and all such embodiments are deemed to fall within the scope of the present invention. Thus, the present invention should be limited only by the claims as set forth below.

What is claimed is:

1. A method for a bank to enable anonymous shipment by a shipper of a package containing goods purchased by a customer from a vendor for delivery to an address unknown to the vendor, the method comprising:

storing personal and financial information associated with the customer in a bank database including an address associated with an account maintained by the customer at the bank;

authenticating the customer to a secure Web site hosted by one or more computer systems operated by the bank providing authenticated customers with electronic access to a plurality of vendors with whom the bank has a partner relationship based on encrypting at least a portion of an identification data provided by the customer via the secure Web site;

receiving an electronic draft directly from the customer via the secure Web site for the purchase of the goods along with a request for a package code for the package;

retrieving at least the authenticated customer's financial information and address from the bank database;

guaranteeing payment to the vendor on the draft only if the customer is authenticated to the secure Web site and bank-imposed restrictions are met;

if the customer is authenticated to the secure Web site and bank-imposed restrictions are met, generating the requested package code using one or more computer systems operated by the bank, the package code being devoid of delivery address information;

sending the generated package code from at least one of the one or more computer systems operated by the bank directly to the vendor, wherein the generated package code does not include any delivery address information for the package; and generating, using one or more computer systems operated by the bank, a shipping identifier for the package that is associated with the generated package code; and sending the generated shipping identifier and the address associated with the customer's account at the bank from at least one of the one or more computer systems directly to the shipper to enable the shipper, after picking up the package for shipment from the vendor, to associate the package code sent to the vendor with the shipping identifier, to identify the associated address as the delivery address of the package, and to ship the package directly from the vendor to the delivery address without divulging any delivery address for the package to the vendor.

2. The method of claim 1, wherein the package code includes at least one of a code number and machine-readable indicia expressing the code number.

3. The method of claim 1, wherein the received request includes at least one of a request for authentication and an electronic draft for payment of at least one of the purchased goods and a shipping charge.

4. The method of claim 1, wherein the receiving and sending steps are performed over a computer network.

5. A method for a shipper to process a package identified by a package code devoid of delivery address information, the package containing goods purchased by a customer from a vendor for shipment to an address unknown to the vendor, the method comprising:

receiving a request to pick up a package from the vendor at one or more computer systems operated by the shipper in communication with one or more computer systems operated by a bank at which the customer maintains an account, the package having a machine-readable package code affixed thereto but no delivery address, the request received in response to the customer being authenticated to a secure Web site operated by the bank that provides authenticated customers with electronic access to a plurality of vendors with whom the bank has a partner relationship and the customer delivering directly to the bank via the secure Web site an electronic draft for the purchase of the goods along with a request for a package code for the package;

receiving, at the one or more computer systems, a shipping identifier and a delivery address associated with the shipping identifier from the bank at which the customer having purchased the goods contained in the package maintains an account, the delivery address being associated with the customer's account at the bank;

generating, with one or more processors associated with one or more computers operated by the shipper, first information in response to picking up the package from the vendor;

generating, with one or more processors associated with one or more computers operated by the shipper, second information in response to reading the package code affixed to the package;

matching, with one or more processors associated with one or more computers operated by the shipper, the package code with the received shipping identifier, and generating, with one or more processors associated with one or more computers operated by the shipper, second information in delivering the package from the vendor directly to the delivery address associated with the shipping identifier.

6. The method of claim 5, further comprising the steps of printing a shipping label on which the delivery address is visible and affixing the shipping label on the package.

7. The method of claim 5, wherein the package code includes at least one of a code number and machine-readable indicia expressing the code number.

8. The method of claim 5, wherein the receiving step is performed over a computer network.

9. A method for a vendor to cause a package of goods purchased by a customer to be delivered to a delivery address that is unknown to the vendor, the method comprising:

sending, from one or more computer systems operated by the vendor, a request for a package code directly to one or more computer systems operated by a bank at which the customer maintains an account that host a secure Web site providing authenticated customers with electronic access to a plurality of vendors with whom the bank has a partner relationship and an electronic draft for payment of the goods on behalf of the customer in response to the customer being authenticated to the secure Web site a purchase of goods from the vendor via the secure Web site;

receiving, at the one or more computer systems operated by the vendor, payment on the draft and the package code from the bank only if the customer is authenticated by the bank and bank-imposed constraints are satisfied, the package code being devoid of delivery address information;

generating, with one or more processors associated with the one or more computer systems, information for preparing the package for shipment by the shipper such that the prepared package bears no delivery address information thereon;

the vendor affixing the received package code to the prepared package, and the vendor surrendering the package to a shipper to enable the shipper to match the package code with a shipping identifier and the delivery address that were previously received by the shipper from the bank, to generate a shipping label specifying the delivery address, to affix the shipping label to the package and to ship the package directly from the vendor to the delivery address without divulging any delivery address to the vendor.

10. The method of claim 9, wherein the package code includes at least one of a code number and machine-readable indicia expressing the code number.

11. The method of claim 9, wherein the request includes at least one of a request for authentication and an electronic draft for payment of at least one of the purchased goods and a shipping charge.

12. The method of claim 9, wherein the receiving and sending steps are performed over a computer network.

* * * * *